United States Patent
Huang et al.

(10) Patent No.: US 12,271,609 B2
(45) Date of Patent: Apr. 8, 2025

(54) CAPACITY ADJUSTMENT METHOD AND RELATED APPARATUS

(71) Applicant: HUAWEI TECHNOLOGIES CO., LTD., Shenzhen (CN)

(72) Inventors: Zengshi Huang, Shenzhen (CN); Hao Pan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/355,233

(22) Filed: Jul. 19, 2023

(65) Prior Publication Data
US 2023/0367493 A1 Nov. 16, 2023

Related U.S. Application Data

(63) Continuation of application No. PCT/CN2022/072411, filed on Jan. 17, 2022.

(30) Foreign Application Priority Data

Jan. 19, 2021 (CN) .......................... 202110071074.4

(51) Int. Cl.
G06F 12/00 (2006.01)
G06F 3/06 (2006.01)
G06F 12/08 (2016.01)

(52) U.S. Cl.
CPC .......... G06F 3/0629 (2013.01); G06F 3/0608 (2013.01); G06F 3/0631 (2013.01);
(Continued)

(58) Field of Classification Search
CPC ...... G06F 3/0631; G06F 3/0685; G06F 12/08; G06F 2212/261; G06F 3/0673; G06F 3/0608; G06F 3/0629
See application file for complete search history.

(56) References Cited

U.S. PATENT DOCUMENTS

| | | | | |
|---|---|---|---|---|
| 2010/0191922 A1* | 7/2010 | Dickey | .................... | G06F 3/064 |
| | | | | 711/E12.001 |
| 2011/0066808 A1* | 3/2011 | Flynn | .................. | G06F 12/0246 |
| | | | | 711/E12.001 |

(Continued)

FOREIGN PATENT DOCUMENTS

| | | | | | |
|---|---|---|---|---|---|
| CN | 112506445 A | * | 3/2021 | ............ | G06F 3/0611 |
| CN | 112783448 A | * | 5/2021 | ........... | G06F 3/0607 |
| CN | 113821158 A | * | 12/2021 | | |

OTHER PUBLICATIONS

English Translation of CN113821158A (Year: 2021).*

(Continued)

*Primary Examiner* — John A Lane
(74) *Attorney, Agent, or Firm* — Leydig, Voit & Mayer, Ltd.

(57) ABSTRACT

A capacity adjustment method applied to a storage system and a related apparatus are provided. The method includes: analyzing cold and hot attributes of data stored in the storage system, to obtain an amount of hot data and an amount of cold data in the data; determining, based on the amount of hot data and the amount of cold data, a capacity of a cache required by the storage system and a capacity of a persistent storage required by the storage system, where the cache required by the storage system comes from a first storage medium set, and the persistent storage required by the storage system comes from a second storage medium set; and adjusting, based on the capacity of the cache and the capacity of the persistent storage, a purpose of a storage medium comprised in the storage system.

20 Claims, 4 Drawing Sheets

(52) U.S. Cl.
CPC ............ *G06F 3/0685* (2013.01); *G06F 12/08* (2013.01); *G06F 2212/261* (2013.01)

(56) References Cited

U.S. PATENT DOCUMENTS

| | | |
|---|---|---|
| 2011/0138148 A1 | 6/2011 | Friedman et al. |
| 2013/0238851 A1 | 9/2013 | Chang et al. |
| 2019/0095109 A1* | 3/2019 | Zhou ..................... G06F 3/0688 |
| 2020/0167074 A1 | 5/2020 | Farhan et al. |
| 2023/0195382 A1* | 6/2023 | Gole ..................... G06F 3/0631 |

OTHER PUBLICATIONS

English Translation of CN112506445A (Year: 2021).*
English Translation of CN112783448A (Year: 2021).*
Matsui et al., "Dynamic Adjustment of Storage Class Memory Capacity in Memory-Resource Disaggregated Hybrid Storage With SCM and NAND Flash Memory," IEE Transactions on Very Large Scale Integration (VLSI) Systems, vol. 27, No. 8, XP011736676, total 12 pages, Institute of Electrical and Electronics Engineers, New York, New York (Aug. 2019).

* cited by examiner

CAPACITY ADJUSTMENT METHOD AND RELATED APPARATUS

CROSS-REFERENCE TO RELATED APPLICATIONS

This application is a continuation of International Application No. PCT/CN2022/072411, filed on Jan. 17, 2022, which claims priority to Chinese Patent Application No. 202110071074.4, filed on Jan. 19, 2021. The disclosures of the aforementioned applications are hereby incorporated by reference in their entireties.

TECHNICAL FIELD

Embodiments of this application relate to the field of data storage technologies, and in particular, to a capacity adjustment method and a related apparatus.

BACKGROUND

With rapid development of storage medium, performance and costs of different storage medium vary greatly, and a plurality of types of hot data exist in a typical service scenario. Therefore, a concept of hybrid storage tiering emerges in the industry. To be specific, a small amount of hot data is stored in a high-performance storage medium with high costs, and a large amount of cold data is stored in a low-performance storage medium with low costs. Based on data read and write features, the high-performance storage medium may be used for two purposes. Because write hot data needs to be frequently rewritten, a persistent feature of a persistent storage may be used to perform an operation on the write hot data, and the write hot data does not need to be flushed to a cold data layer. However, read hot data changes frequently, and does not need to be synchronized with the cold data layer during swap-in and swap-out. Therefore, a cache may be used to perform an operation on the read hot data.

In different service scenarios, two manners are provided in a conventional technology to adjust a capacity of an allocated storage medium to support execution of a service access requirement. In a first manner, a dynamic random access memory (DRAM) and a non-volatile memory (NVM) are addressed in a unified manner to construct a converged memory system. Then, in the converged memory system, the DRAM is dynamically used as a memory or a memory of the NVM based on a read/write hotspot ratio of data. In a second manner, in a hybrid storage system including a solid-state drive (SSD) and a hard disk drive (HDD) at a same layer, a storage pool is constructed for a high-performance SSD medium. A ratio of a capacity of the SSD medium used as a cache to a capacity of the SSD medium used as a persistent storage in the storage pool is dynamically adjusted based on a read/write hotspot ratio. However, in the first manner, only a purpose of using the DRAM as the memory in the converged memory system is considered, and data in the NVM still needs to be flushed downwards to meet data persistence. This causes extra overheads. In the second manner, only a ratio of a capacity of a same storage medium used as persistent storage to a capacity of the same storage medium used as a cache at a same layer is considered.

Therefore, in different service scenarios, how to adjust a capacity of a storage medium to maximize medium utilization, and use fewer high-performance storage medium to meet service scenario requirements, and effectively reduce storage costs has become an urgent problem to be resolved.

SUMMARY

Embodiments of this application provide a capacity adjustment method and a related apparatus, to maximize utilization of various types of storage medium and meet storage capacity requirements of storage medium for different purposes in different services. In addition, corresponding data is stored by using storage capacities of the storage medium for different purposes, thereby greatly improving system performance and effectively reducing storage costs.

According to a first aspect, an embodiment of this application provides a capacity adjustment method. The method is applied to a storage system. The storage system may be a distributed storage system, or may be a centralized storage system. The method may include: analyzing cold and hot attributes of data stored in the storage system, to obtain an amount of hot data and an amount of cold data in the data; determining, based on the amount of hot data and the amount of cold data, a capacity of a cache required by the storage system and a capacity of a persistent storage required by the storage system, where the cache required by the storage system comes from a first storage medium set, the first storage medium set includes one or more different storage medium, the persistent storage required by the storage system comes from a second storage medium set, and the second storage medium set includes one or more different storage medium; and adjusting, based on the capacity of the cache and the capacity of the persistent storage, a purpose of a storage medium included in the storage system.

In the foregoing manner, because the storage system includes one or more types of different storage medium, after the amount of hot data and the amount of cold data in the data are obtained by analyzing the cold and hot attributes of the data stored in the storage system, the capacity of the cache required by the storage system and the capacity of the persistent storage required by the storage system are determined, and the purpose of the storage medium included in the storage system is adjusted based on the capacity of the cache and the capacity of the persistent storage. That is, each type of storage medium used as the capacity of the cache an d the capacity of the persistent storage is determined. In other words, by analyzing the cold and hot attributes of the data, a plurality of types of storage medium included in the storage system can be properly considered for flushing the data into the storage system, and purposes of the various types of storage medium can be properly adjusted based on the capacity of the cache required by the storage system and the capacity of the persistent storage required by the storage system, so that utilization of the various types of storage medium is maximized, thereby meeting storage capacity requirements of storage medium for different purposes in different services. In addition, corresponding data is stored by using storage capacities of the storage medium for different purposes, thereby greatly improving system performance and effectively reducing storage costs.

Optionally, in some examples, a type of a storage medium included in the first storage medium set include a dynamic random access memory DRAM, a storage class memory SCM, a solid-state drive SSD, or a read-only memory ROM, and a type of a storage medium included in the second storage medium set include an SCM, an SSD, or a hard disk drive HDD.

In the foregoing manner, the type of the storage medium included in the first storage medium set include the DRAM, the SCM, the SSD, or the ROM. However, in actual application, the storage medium are not limited to the listed types. For example, the storage medium may further include a RAM, an SRAM, or the like. This is not limited herein, and storage medium with different performance are provided for subsequent application to different scenarios. Similarly, the type of the storage medium included in the second storage medium set include the SCM, the SSD, or the HDD, but are not limited to the listed types in actual application. For example, the second storage medium set may further include an Optane SSD, an NAND SSD, or the like. This is not limited herein.

Optionally, in some other examples, the type of the storage medium included in the first storage medium set is different from the type of the storage medium included in the second storage medium set. In the foregoing manner, in the storage system, if each type of storage medium includes only one storage medium, some types of storage medium may be used as a cache, and the other types of storage medium may be used as a persistent storage. A plurality of manners are provided to meet different storage requirements.

Optionally, in some other examples, the first storage medium set and the second storage medium set include storage medium of a same type. In the foregoing manner, in the storage system, if each type of storage medium may include a plurality of storage medium, some types of storage medium may be used as a cache, and the other types of storage medium may be used as a persistent storage. For example, when the storage system includes two SCMs, one SCM may be used as a cache, and the other SCM may be used as the persistent storage. This provides a plurality of manners to meet different storage requirements.

Optionally, in some other examples, the determining, based on the amount of hot data and the amount of cold data, a capacity of a cache required by the storage system and a capacity of a persistent storage required by the storage system includes: determining, based on the amount of hot data and the amount of cold data, and capacities of various types of storage medium included in the storage system, the capacity of the cache required by the storage system and the capacity of the persistent storage required by the storage system.

According to a second aspect, an embodiment of this application provides a capacity adjustment apparatus. The capacity adjustment apparatus may be located in a storage system. The storage system includes a first storage medium set and a second storage medium set. The first storage medium set includes one or more different storage medium. The second storage medium may also include one or more different storage medium. The foregoing capacity adjustment apparatus may include: an analysis module, configured to analyze cold and hot attributes of data stored in the storage system, to obtain an amount of hot data and an amount of cold data in the data; a processing module, configured to determine, based on the amount of hot data and the amount of cold data, a capacity of a cache required by the storage system and a capacity of a persistent storage required by the storage system, where the cache required by the storage system comes from the first storage medium set, and the persistent storage required by the storage system comes from the second storage medium set; and the processing module is configured to adjust, based on the capacity of the cache and the capacity of the persistent storage, a purpose of a storage medium included in the storage system.

It should be understood that the foregoing storage system may be a distributed storage system, or may be a centralized storage system. In one aspect, the distributed storage system is used as an example. The distributed storage system includes one or more storage nodes, and the described capacity adjustment apparatus may be a storage node in the distributed storage system. In another aspect, the centralized storage system is used as an example. The centralized storage system includes a storage array. Therefore, the described capacity adjustment apparatus may also be a storage array or the like in the centralized storage system. In an actual application, the described capacity adjustment apparatus may also be an independent server, or may be a device having both a storage capability and a computing capability, such as a persistent storage enclosure. This is not limited herein.

Optionally, in some other examples, a type of a storage medium included in the first storage medium set includes a DRAM, an SSD, an SCM, or a ROM, and a type of a storage medium included in the second storage medium set includes an SCM, an SSD, or an HDD.

Optionally, in some other examples, the type of the storage medium included in the first storage medium set is different from the type of the storage medium included in the second storage medium set.

Optionally, in some other examples, the first storage medium set and the second storage medium set include storage medium of a same type.

Optionally, in some other examples, the processing module is specifically configured to determine, based on the amount of hot data and the amount of cold data, and capacities of various types of storage medium included in the storage system, the capacity of the cache required by the storage system and the capacity of the persistent storage required by the storage system.

According to a third aspect, an embodiment of this application provides a storage device. The storage device may be a storage node in the distributed storage system provided in the first aspect, or may be an independent server, or may be a device such as a persistent storage enclosure that has both a storage capability and a computing capability, or may be a storage array in a centralized storage system, or the like. The storage device may include a storage and a processor coupled to the storage. The storage may be configured to store computer-readable instructions. The processor may be specifically configured to: analyze cold and hot attributes of data stored in the storage system, to obtain an amount of hot data and an amount of cold data in the data; determine, based on the amount of hot data and the amount of cold data, a capacity of a cache required by the storage system and a capacity of a persistent storage required by the storage system, where the cache required by the storage system comes from a first storage medium set, the first storage medium set includes one or more different storage medium, the persistent storage required by the storage system comes from a second storage medium set, and the second storage medium set includes one or more different storage medium; and adjust, based on the capacity of the cache and the capacity of the persistent storage, a purpose of a storage medium included in the storage system.

In an implementation, a type of a storage medium included in the first storage medium set include a dynamic random access memory DRAM, a storage class memory SCM, a solid-state drive SSD, or a read-only memory ROM, and a type of a storage medium included in the second storage medium set include an SCM, an SSD, or a hard disk drive HDD.

In an implementation, the type of the storage medium included in the first storage medium set is different from the type of the storage medium included in the second storage medium set.

In an implementation, the first storage medium set and the second storage medium set include storage medium of a same type.

In an implementation, the processor is further specifically configured to determine, based on the amount of hot data and the amount of cold data, and capacities of various types of storage medium included in the storage system, the capacity of the cache required by the storage system and the capacity of the persistent storage required by the storage system.

According to a fourth aspect, an embodiment of this application provides a computer-readable storage medium, including instructions. When the instructions are run on a computer, the computer is enabled to perform the method in any one of the first aspect or the possible implementations of the first aspect.

According to a fifth aspect, an embodiment of this application provides a computer program product, including instructions. When the computer program product runs on a computer, the computer is enabled to perform the method in wan one of the first aspect or the possible implementations of the first aspect.

Technical effects achieved in the second aspect, the third aspect, the fourth aspect, and the fifth aspect are similar to those achieved by corresponding technical means in the first aspect. Details are not described again herein.

According to the foregoing technical solutions, it can be learned that embodiments of this application have the following advantages:

In this embodiment of this application, because the storage system includes one or more types of different storage medium, after the amount of hot data and the amount of cold data in the data are obtained by analyzing the cold and hot attributes of the data stored in the storage system, the capacity of the cache required by the storage system and the capacity of the persistent storage required by the storage system are determined, and the purpose of the storage medium included in the storage system is adjusted based on the capacity of the cache and the capacity of the persistent storage. That is, each type of storage medium used as the capacity of the cache and the capacity of the persistent storage is determined. In other words, by analyzing the cold and hot attributes of the data, a plurality of types of storage medium included in the storage system can be properly considered for flushing the data into the storage system, and purposes of the various types of storage medium can be properly adjusted based on the capacity of the cache required by the storage system and the capacity of the persistent storage required by the storage system, so that utilization of the various types of storage medium is maximized, thereby meeting storage capacity requirements of storage medium for different purposes in different services. In addition, corresponding data is stored by using storage capacities of storage medium for different purposes, thereby greatly improving system performance and effectively reducing storage costs.

BRIEF DESCRIPTION OF DRAWINGS

To describe the technical solutions in embodiments of this application more clearly, the following briefly describes the accompanying drawings for describing embodiments. It is clear that the accompanying drawings in the following description show merely some embodiments of this application.

DESCRIPTION OF EMBODIMENTS

Embodiments of this application provide a capacity adjustment method and a related apparatus, to maximize utilization of various types of storage medium and meet storage capacity requirements of storage medium for different purposes in different services. In addition, corresponding data is stored by using storage capacities of the storage medium for different purposes, thereby greatly improving system performance and effectively reducing storage costs.

The following clearly describes the technical solutions in embodiments of this application with reference to the accompanying drawings in embodiments of this application. It is clear that the described embodiments are some but not all of embodiments of this application. All other embodiments obtained by persons of ordinary skill in the art based on embodiments of this application without creative efforts shall fall within the protection scope of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of this application described herein can be implemented in orders except the order illustrated or described herein. Moreover, the terms "include", "have", or any other variant thereof are intended to cover non-exclusive inclusion. In this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one of a, b, or c may represent: a, b, c, a and b, a and c, b and c, or a, b, and c, where a, b, and c may be singular or plural. It should be noted that "at least one item (piece)" may also be explained as "one item (piece) or more items (pieces)".

Figure 1:
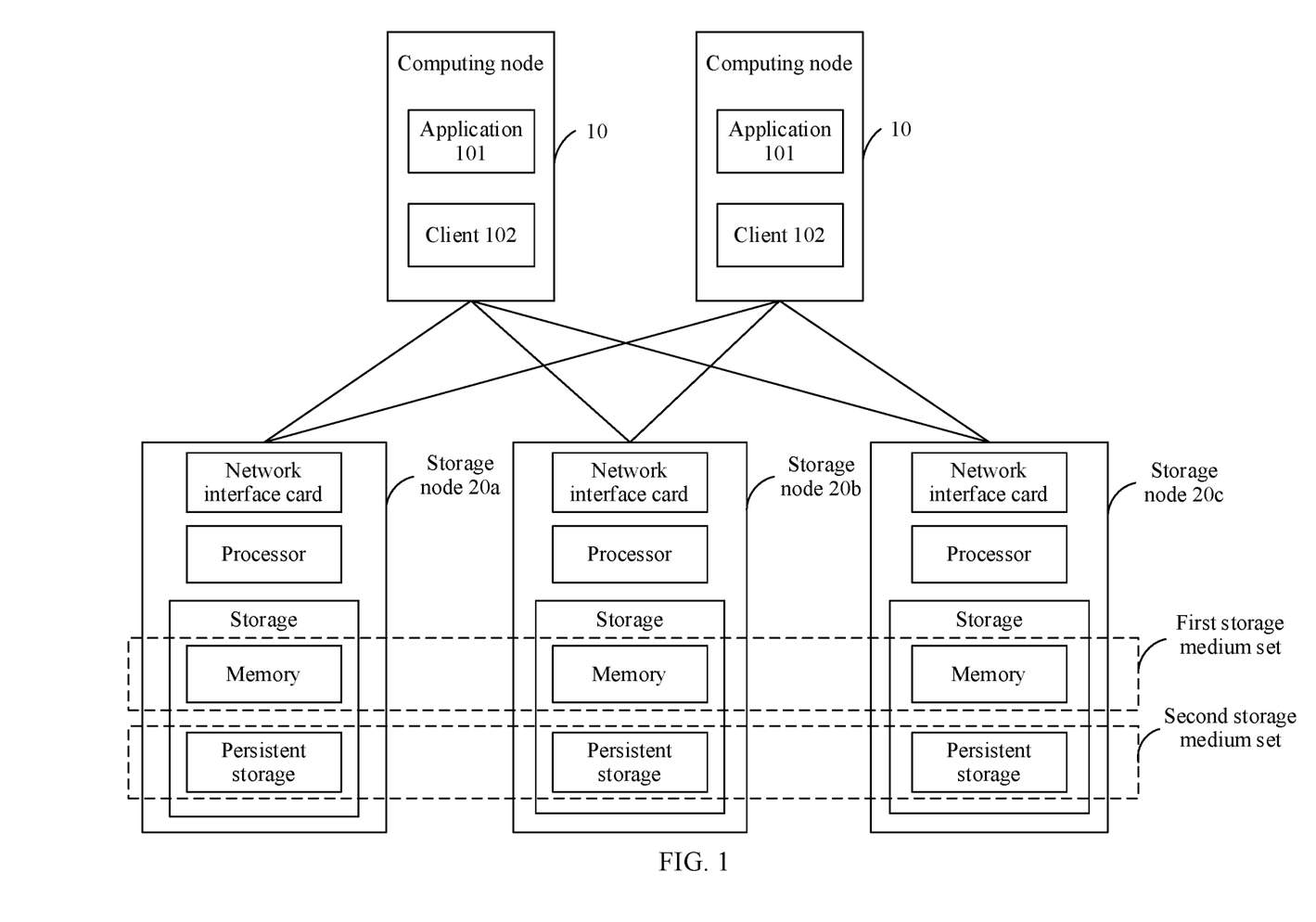
FIG. 1 is a diagram of an architecture of a storage system according to an embodiment of this application.

FIG. 1 is a schematic diagram of a structure of a storage system according to an embodiment of this application. As shown in FIG. 1, the storage system includes a computer node cluster and a storage node cluster. The computing node cluster includes one or more computing nodes 10 (FIG. 1 shows two computing nodes 10, but there are not limited to the two computing nodes 10). The computing node 10 is a computing device on a user side, for example, a server or a desktop computer. At a hardware layer, a processor and a memory (not shown in FIG. 1) are disposed in the computing node 10. At a software layer, an application program (application) 101 and a client program (client) 102 are run on the computing node 10. The application 101 is a general term of various applications presented to a user. The client 102 is configured to: receive a data access request triggered by the application 101, interact with a storage node 20, and send the data access request to the storage node 20. The client 102 is further configured to: receive data from a storage node, and forward the data to the application 101. It may be understood that, when the client 102 is a software program, functions of the client 102 are implemented by a processor included in the computing node 10 by running a program in a memory. The client 102 may alternatively be implemented by a hardware component located inside the computing node 10. Any client 102 in the computing node cluster may access any storage node 20 in the storage node cluster.

The storage node cluster includes one or more storage nodes 20 (FIG. 1 shows three storage nodes 20, such as a storage node 20a, a storage node 20b, and a storage node 20c, but is not limited to the three storage nodes 20 in practice), and the storage nodes 20 may be interconnected. The storage node may be a server, a desktop computer, a controller of a storage array, or a persistent storage enclosure. In terms of functions, the storage node 20 is mainly configured to perform computation, processing, or the like on data.

In terms of hardware, as shown in FIG. 1, the storage node 20 includes at least a processor, a storage, and a network interface card.

The processor is a central processing unit (CPU), and is configured to process data from the outside of the storage node 20 or data generated inside the storage node 20. The storage is an apparatus configured to store data. In this embodiment of this application, the storage includes a memory and a persistent storage.

Figure 2:
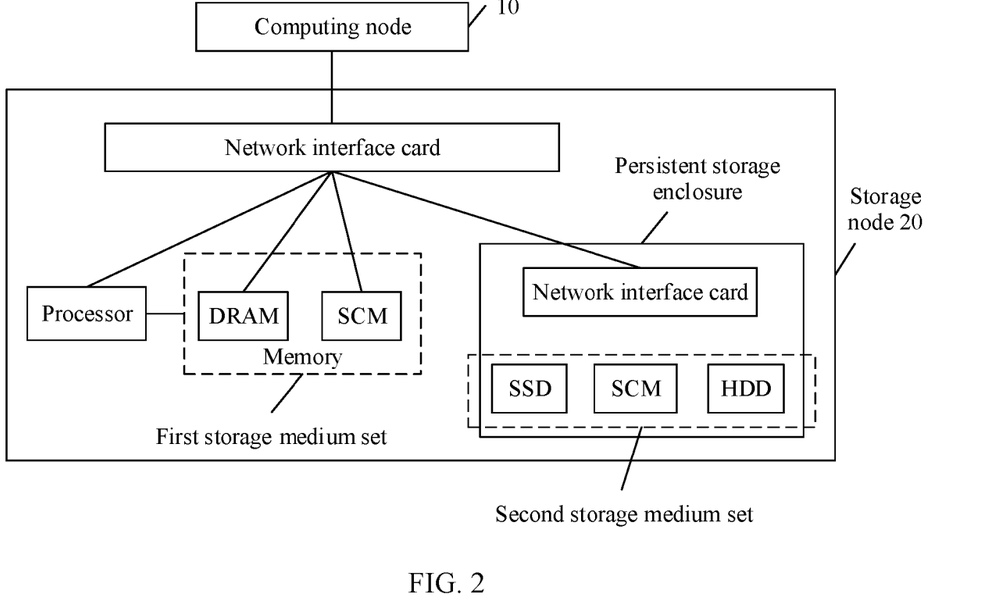
FIG. 2 is a diagram of an architecture of another storage system according to an embodiment of this application.

The memory is an internal storage that directly exchanges data with the processor. The storage can read and write the data at a fast speed at any time, and serves as a temporary data storage of an operating system or another running program. The storage has higher access performance. The memory may include one or more types of different storage medium. For example, the memory may be a random access memory or may be a read-only memory (ROM). The described random access memory may be a dynamic random access memory (DRAM), or may be a storage class memory (SCM) The DRAM is a semiconductor memory, and is a volatile memory device like most random access memories (RAM). The SCM is a composite storage technology that combines both a conventional storage apparatus feature and a storage feature. The SCM can provide a faster read/write speed than the persistent storage, but is slower than the DRAM in terms of a computing speed and cheaper than the DRAM in terms of costs. It should be noted that the processor may directly access the memory. For example, as shown in FIG. 2, the processor may directly access the DRAM and the SCM.

It should be noted that the memory described in this application may be a special form of a cache. Data in the cache may be quickly accessed in short time, and has high access performance. In addition, when the data in the cache does not need to be used, the data in the cache may be directly discarded. In addition, in this application, in addition to the memory described above, a storage medium such as an SSD or an HDD may also be used as the cache. This is not limited herein. In addition, in this embodiment of this application, only an example in which the memory is used as the cache is used for description.

However, the DRAM and the SCM are merely examples for description in this embodiment. In some possible cases, the memory may alternatively include one of the DRAM and the SCM, or may further include a storage medium such as a ROM. Alternatively, the memory may include another random access memory, for example, a static random access memory (SRAM). The read-only memory may be a programmable read-only memory (PROM), an erasable programmable read-only memory (EPROM), or the like. In addition, the memory may also be a dual in-line memory module or a dual line memory module (DIMM), that is, a module formed by a dynamic random access memory (DRAM). In a subsequent embodiment, an example in which the storage medium such as the DRAM or the SCM is used as the cache is used for description.

The persistent storage reads and writes data at a slower speed than the cache, and is usually used to store data persistently. The storage node 20a is used as an example, and one or more persistent storages are disposed inside the storage node 20a. Alternatively, a persistent storage enclosure (as shown in FIG. 2) is mounted outside the storage node 20, and a plurality of persistent storages are disposed in the persistent storage enclosure. Regardless of a deployment manner, these persistent storages may be considered as persistent storages included in the storage node 20. The persistent storage herein may be a physical persistent storage, or may be a logical domain or a fault domain that includes a plurality of physical persistent storages. This is not limited in this embodiment of this application. In addition, a type of the physical persistent storage is a solid state persistent storage, a mechanical persistent storage, or a persistent storage of another type.

It should be noted that the storage included in the cache and the persistent storage may be storage medium of a same type, or may be two storage medium of different types. Compared with the persistent storage, cached data is read faster and has a shorter delay, that is, performance of the cache is better than performance of the persistent storage. In addition, to adjust a purpose of a storage medium in the cache and a purpose of a storage medium in the persistent storage, in this embodiment of this application, as shown in FIG. 1 and FIG. 2, a first storage medium set may be considered as a source of a cache required by each storage node 20. A second storage medium set may be considered as a source of a persistent storage required by each storage node 20.

It should be understood that when the first storage medium set described above may include a plurality of types of different storage medium, each storage medium may also be used as a medium layer, for example, a storage medium such as a DRAM and an SCM shown in FIG. 2. DRAMs in each storage node form a medium layer, and SCMs form a medium layer. The second storage medium set described above may also include a plurality of types of different storage medium, for example, a storage medium such as an SCM, an SSD, and an HDD shown in FIG. 2. In subsequent embodiments, an example in which the first storage medium set includes one or more different storage medium and the second storage medium set includes one or more different storage medium is used for description.

The network interface card is configured to communicate with another storage node, or is configured to communicate with a disk enclosure coupled to the storage node. In addition, the network interface card may directly access the memory in the storage node. As shown in FIG. 2, the network interface card may directly access the DRAM and the SCM.

Figure 3:
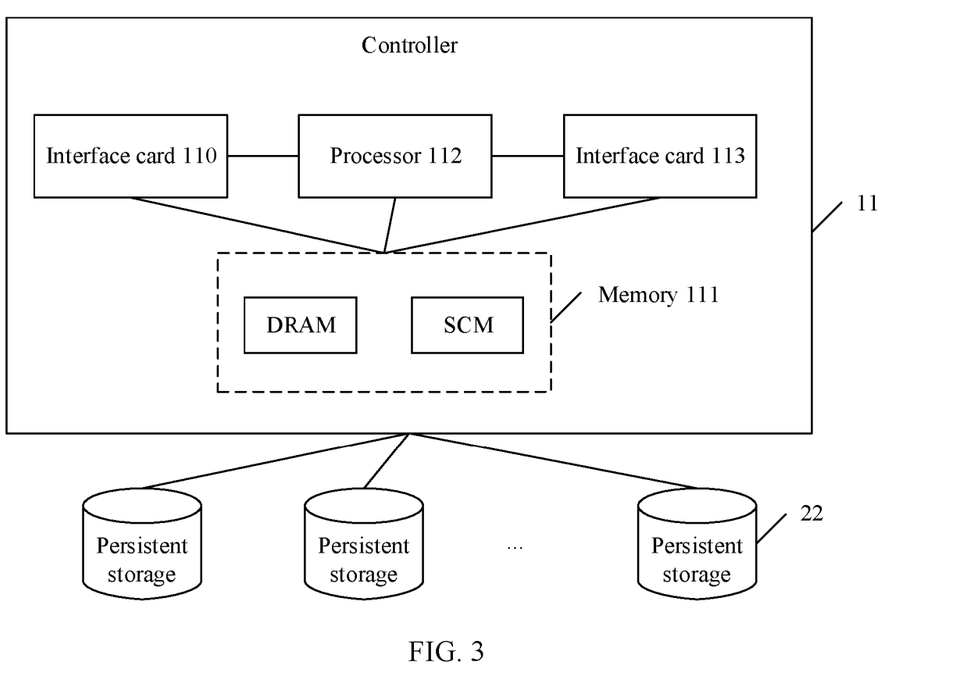
FIG. 3 is a diagram of an architecture of a system of a storage device according to an embodiment of this application.

FIG. 3 is a schematic diagram of a structure of another storage system according to an embodiment of this application. The storage system shown in FIG. 3 is a storage array, and the storage array includes at least one controller (controller 11 shown in FIG. 3) and a plurality of persistent storages 22. The controller 11 is connected to a host (not shown in the figure) by using a storage area network (SAN). The controller 11 may be a computing device such as a server and a desktop computer. An operating system and an application are installed in the controller 11. The controller 11 may receive an input/output (I/O) request from the host. The controller 11 may further store data (if exists) carried in the I/O request, and write the data into the persistent storage 22. The persistent storage 22 may be a hard disk drive or a solid-state drive. The solid-state drive is a storage using a flash memory chip as medium, and may also be referred to as an SSD.

FIG. 3 is merely an example for description. In actual application, the storage array may include two or more controllers. A physical structure and a function of each controller are similar to those of the controller 11. In addition, a connection manner between controllers and a connection manner between any controller and the persistent storage 22 are not limited in this embodiment, provided that the controllers can communicate with each other and the controllers and the persistent storage 22 can communicate with each other. In addition, in this embodiment, the persistent storage may be a physical hard disk, or may be a logical domain or a fault domain that includes a plurality of physical hard disks. This is not limited in this embodiment of this application.

As shown in FIG. 3, the controller 11 includes an interface card 110, a processor 112, and an interface card 113.

The interface card 110 is configured to communicate with the host, and the controller 11 receives an operation instruction of the host through the interface card 110. The processor 112 may be a central processing unit (CPU), In this embodiment of this application, the processor 112 is configured to: receive an I/O request from the host and process the I/O request. The I/O request is a data write request or a data read request, and the processor 112 may further send data in the data write request to the persistent storage 22. The interface card 113 is configured to communicate with the persistent storage 22. The controller 11 sends, through the interface card 113, the data write request (including the data, a logical address of the data, and a virtual address of the data) to the persistent storage 22 for storage. In addition, the controller 11 further includes a memory 111. The memory 111 is configured to temporarily store data received from the host or data read from the persistent storage 22. When receiving a plurality of data write requests sent by the host, the controller 11 may temporarily store, in the memory 111, data in the plurality of data write requests. When a capacity of the memory 111 reaches a specific threshold, the data stored in the memory 111, the virtual address of the data, and the logical address allocated to the data are sent to the persistent storage 22. The persistent storage 22 stores the received data. The memory 111 may include a volatile memory, a flash memory chip, or a combination thereof. The volatile memory is, for example, a random-access memory (RAM).

The flash memory chip is any machine-readable medium that can store program code, such as a floppy disk or an optical disc. The memory 111 has a power protection function. The power protection function means that the data stored in the memory 111 is not lost when the system is powered off and then powered on again.

In different service scenarios, a ratio of read hot data to write hot data changes continuously, and read/write performance and costs of storage medium vary accordingly. On one hand, as a storage medium of a cache, the read hot data can be stored by using a feature of the cache, and access performance is high. This provides high access efficiency for subsequent read hot data reading, and reduces access overheads. On the other hand, as a storage medium of a persistent storage, the write hot data can also be stored by using a persistence feature of the persistent storage. If there is a large amount of the read hot data in the data, it is expected that more storage medium that can be used as the cache can be allocated from a plurality of types of storage medium in the storage system to store the read hot data. Similarly, if there is a large amount of the write hot data in the data, it is also expected that more storage medium that can be used as the persistent storage can be allocated from a plurality of types of storage medium in the storage system to store the write hot data.

However, in a related technology, either the DRAM is directly used as a memory or a memory used for the NVM dynamically based on a read/write hotspot ratio of data, or only allocation of a capacity of a same storage medium used as the cache and a capacity of the same storage medium used as the persistent storage at a same layer is considered. Overall impact of various types of storage medium in the storage system is not globally considered.

Therefore, if purposes of various types of storage medium in the first storage medium set and the second storage medium set in FIG. 1 to FIG. 3 can be dynamically and properly adjusted for different service requirements, utilization of the various types of storage medium is maximized, thereby meeting storage capacity requirements of storage medium for different purposes in different services. In addition, corresponding data is stored by using storage capacities of the storage medium for the different purposes, thereby greatly improving system performance and effectively reducing storage costs.

In addition to the system structures shown in FIG. 1 to FIG. 3, the capacity adjustment method in this embodiment may further be applicable to another system architecture. This is not specifically limited herein.

Figure 4:
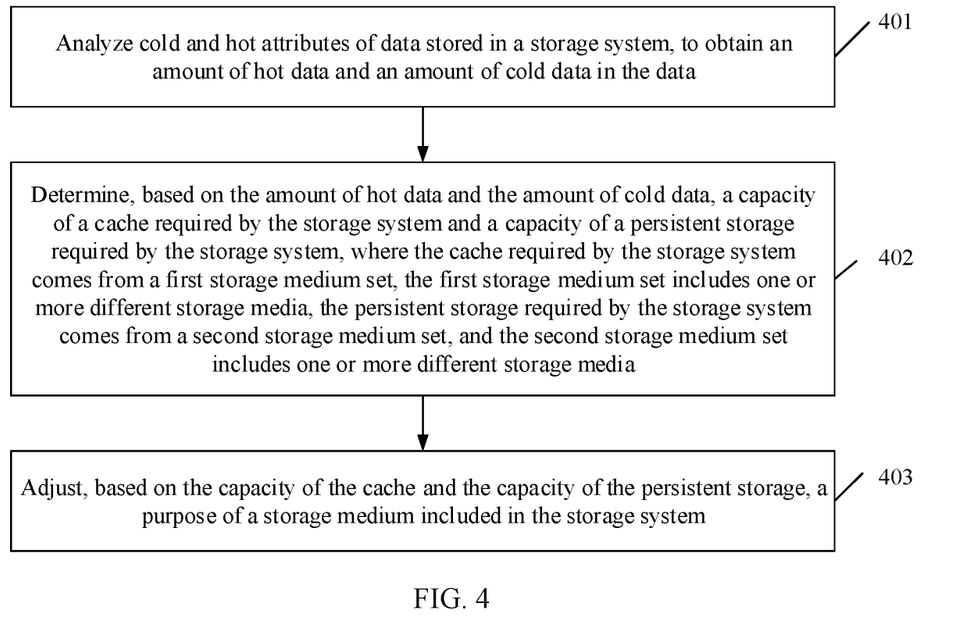
FIG. 4 is a flowchart of a capacity adjustment method according to an embodiment of this application.

In addition to the memory described above, a storage medium such as the SSD or the HDD may also be used as the cache. However, for better understanding of the solutions provided in embodiments of this application, the following describes a specific procedure in this embodiment by using an example in which the DRAM and the SCM are used as the cache, and the SSD and the HDD are used as the persistent storage. FIG. 4 is a flowchart of a capacity adjustment method according to an embodiment of this application. The method may include the following steps.

401: Analyze cold and hot attributes of data stored in a storage system, to obtain an amount of hot data and an amount of cold data in the data.

It can be learned from the foregoing descriptions in FIG. 1 to FIG. 3 that the storage system includes the first storage medium set and the second storage medium set. The first storage medium set includes one or more different storage medium, and the second storage medium set includes one or more different storage medium. In this embodiment of this application, the capacity adjustment method is described by using an example in which the first storage medium set includes a DRAM and an SCM, and the second storage medium set includes an SSD and an HDD.

In this example, the data is generally stored in the storage system described in FIG. 1 to FIG. 3. For example, the data may be stored in the memory or the persistent storage in the distributed storage system shown in FIG. 1 or FIG. 2, or stored in the memory 111 or the persistent storage 22 in the centralized storage system shown in FIG. 3. This is not limited herein. Therefore, after the stored data is obtained from the storage system, cold and hot attributes analysis may be performed on the data stored in the storage system, to obtain the amount of hot data and the amount of cold data in the data.

It should be noted that the data stored in the storage system may include but is not limited to service data, metadata, and intermedium data. The described service data may be understood as service data obtained for a service access requirement proposed by a user. The metadata may be understood as data used to describe the data, including description of a definition, a structure, and the like of the data. The intermedium data may be understood as data between source data and result data.

The described cold and hot attributes of the data may include but are not limited to access frequency of the data and the like. In addition, the hot data and the cold data may be distinguished from each other based on the access frequency of the data. For example, data corresponding to access frequency that is of a user for data and that is higher than a preset access threshold is referred to as the hot data, and data corresponding to access frequency that is of a user for data and that is lower than the preset access threshold is referred to as the cold data. It should be understood that the foregoing preset access threshold depends on a situation, and is not limited herein. In addition, in actual application, the hot data and the cold data may be further distinguished from each other based on an access proportion, an access mode, update frequency, and the like of the data. This is not limited herein.

It may be understood that, if the capacity adjustment method is applied to the storage system shown in FIG. 1 or FIG. 2, any one of the plurality of storage nodes (for example, the storage node 20*a*, the storage node 20*b*, or the storage node 20*c*) in the storage system or a node, in the storage system, that is independent of the storage node and that is configured to manage the storage nodes may be used to analyze the cold and hot attributes of the data stored in the memory and the persistent storage. Then, the amount of hot data and the amount of cold data in the data are obtained. If the capacity adjustment method is applied to the centralized storage system shown in FIG. 3, a controller in the centralized storage system may perform cold and hot attributes analysis on the data stored in the storage system, to obtain the amount of hot data and the amount of cold data in the data. Specifically, this is not limited in embodiments of this application.

402: Determine, based on the amount of hot data and the amount of cold data, a capacity of a cache required by the storage system and a capacity of a persistent storage required by the storage system, where the cache required by the storage system comes from a first storage medium set, the first storage medium set includes one or more different storage medium, the persistent storage required by the storage system comes from a second storage medium set, and the second storage medium set includes one or more different storage medium.

In this example, the described capacity of the cache required by the storage system comes from the first storage medium set. It may be understood that a capacity of one or more different storage medium in the first storage medium set may be used as the capacity of the cache. Similarly, the capacity of the persistent storage required by the storage system comes from the second storage medium set. It may also be understood that a capacity of one or more different storage medium in the second storage medium set may be used as the capacity of the persistent storage.

In addition, because the hot data has high access frequency, the cold data has low access frequency. In addition, it can be learned from the content described in FIG. 1 to FIG. 3 that the cache may read and write the data at any time, and a read/write speed of the cache is faster than a read/write speed of the persistent storage. In addition, the read hot data in the hot data may be stored by using the cache, and the write hot data in the hot data may be stored persistently by using the persistent storage.

Therefore, after the amount of hot data and the amount of cold data in the data are obtained by analyzing the cold and hot attributes of the data, the capacity of the cache and the capacity of the persistent storage that are required by the storage system may be determined based on the amount of hot data and the amount of cold data, and then a purpose of each storage medium in the storage system can be dynamically adjusted based on the capacity of the cache and the capacity of the persistent storage. In other words, a ratio of a capacity of the cache to a capacity of the persistent storage in the storage medium is adjusted. In this way, the capacity of each storage medium can be properly used to store the read hot data and the write hot data. This provides a better access basis for different service scenarios.

Specifically, step 402 may be performed by any storage node in the plurality of storage nodes in the storage system shown in FIG. 1 or FIG. 2, or the controller in the storage system shown in FIG. 3, so that a capacity of a cache required by a corresponding storage system and a capacity of a persistent storage required by the storage system can be determined based on the amount of hot data and the amount of cold data. In actual application, step 402 may also be performed by a node that is in the storage system shown in FIG. 1 or FIG. 2 and that is independent of the storage node and that can be configured to manage each storage node. This is not limited herein.

In some examples, a type of a storage medium included in the first storage medium set described above may include but are not limited to a DRAM, an SCM, an SSD, a ROM, or the like. Types of storage medium included in the second storage medium set described above may include but are not limited to an SCM, an SSD, an HDD, or the like. The SSD may further include but is not limited to an Optane SSD, an NAND SSD, or the like. This is not specifically limited herein.

In addition, in some other embodiments, because the storage medium included in the storage system may be used as both the cache and the persistent storage, the following two cases may specifically exist.

In a first case, the type of the storage medium included in the first storage medium set is different from the type of the storage medium included in the second storage medium set. In other words, the storage medium in the first storage medium set may be used as the cache, and then the read hot data in the hot data is stored by using a feature of the cache. Similarly, the storage medium in the second storage medium set is used as the persistent storage, and then the write hot data in the hot data is stored by using a feature of the persistent storage. For example, in the storage system shown in FIG. 2, when there is only one storage medium of each type in the storage system, the memory DRAM and the SCM may be used as caches to store the read hot data, and the SSD, the HDD, or the like may be used as persistent storages to store the write hot data. This is not limited herein.

In a second case, the first storage medium set and the second storage medium set include storage medium of a same type. It is understood that the storage medium of the same type may also have different purposes. To be specific, the storage medium of the sane type may be used as the cache, so that the read hot data in the hot data can be stored by using the feature of the cache, or may be synchronously used as the persistent storage, and write hot data in the hot data can be stored by using a persistent feature. For example, if the storage system shown in FIG. 2 may include at least two SCMs, one SCM may be used as the cache to store the read hot data in the hot data, and the remaining SCM is used as the persistent storage to store the write hot data in the hot data. This is not limited herein. It should be understood that, in an actual application, the storage system may further include storage medium such as a plurality of DRAMs, a plurality of SSDs, and a plurality of HDDs. In this case, one or more DRAMs and one or more SSDs may be used as caches, and remaining SSDs and one or more HDDs are used as persistent storages. Details are not described herein.

In some other embodiments, for the determining, based on the amount of hot data and the amount of cold data, the capacity of the cache required by the storage system and the capacity of the persistent storage required by the storage system, the following manner may be used: determining, based on the amount of hot data and the amount of cold data, and capacities of various types of storage medium included in the storage system, the capacity of the cache required by the storage system and the capacity of the persistent storage required by the storage system.

In this example, to more properly use the capacity of each storage medium used as the cache and the capacity of each storage medium used as the persistent storage in the storage system, after the amount of hot data and the amount of cold data are obtained, the required capacity of the cache and the required capacity of the persistent storage may be further determined with reference to capacities of various types of storage medium included in the storage system.

Specifically, in a process of accessing the storage system, both the required cache capacity and the required persistent storage capacity come from various types of storage medium included in the storage system, and performance changes of the various types of the storage medium can reflect comprehensive system performance of the storage system when the amount of hot data and the amount of cold data are flushed into the various types of storage medium. Therefore, an optimal ratio between the capacity that can be used as the cache and the capacity that can be used as the persistent storage in the various storage medium may be determined from a rule of comprehensive system performance of the storage system.

In other words, a hot data proportion and a cold data proportion are determined based on the amount of hot data and the amount of cold data. Access proportions of the various types of the storage medium included in the storage system when the storage system is accessed are evaluated based on the hot data proportion and the cold data proportion. The described access proportions may be understood as a ratio of a capacity actually used as the cache and a capacity actually used as the persistent storage to an entire storage medium when each type of storage medium is accessed.

Then, the comprehensive system performance of the storage system is determined based on the access proportions. In this way, when the access proportions of the various types of storage medium change, a regular change of comprehensive system performance of the storage system can be determined, and then a target comprehensive performance is determined from the regular change of the comprehensive system performance. Capacities of the various types of storage medium corresponding to the target comprehensive performance are used as finally required cache capacities and persistent storage capacities.

For example, the first storage medium set shown in FIG. 2 includes the DRAM and the SCM, and the second storage medium set includes the SSD and the HDD. It is assumed that the amount of hot data in the data obtained through analysis is a data amount of 800 units, and the amount of cold data in the data is a data amount of 200 units. A corresponding hot data proportion is 80%, and a corresponding cold data proportion is 20%. In this way, it can be evaluated that the access proportions when the storage medium is accessed are 50%, 40%, 5%, and 5% respectively. Similarly, when it is evaluated that access proportions of the various types of storage medium change, performance changes of the various types of storage medium may be specifically understood with reference to the following Table 1.

TABLE 1

| Storage medium | Access proportions | Latency of accessing a storage medium | Average latency of accessing a storage medium |
|---|---|---|---|
| DRAM | 50% | T1 | f11 = 50% × T1 |
|  | 70% |  | f21 = 70% × T1 |
|  | 60% |  | f31 = 60% × T1 |
| SCM | 40% | T2 | f12 = 40% × T2 |
|  | 10% |  | f22 = 10% × T2 |
|  | 20% |  | f32 = 20% × T2 |
| SSD | 5% | T3 | f13 = 5% × T3 |
|  | 10% |  | f23 = 10% × T3 |
|  | 15% |  | f33 = 15% × T3 |
| HDD | 5% | T4 | f14 = 5% × T4 |
|  | 10% |  | f24 = 10% × T4 |
|  | 5% |  | f34 = 5% × T4 |

It should be noted that performance of various types of storage medium may be reflected from average latencies of accessing the storage medium. Therefore, the performance of the various types of storage medium may be determined by determining an average latency of accessing the various types of storage medium. Specifically, it can be learned from Table 1 that, if it is evaluated that access proportions of accessing the DRAM, the SCM, the SSD, and the HDD are 50%, 40%, 5%, and 5% respectively, and delays of accessing the various types of storage medium are determined, average delays of accessing various types of storage medium are f11=(50%×1000×T1)/1000=50%×T1, f12=(40%×1000×T2)/1000=40%×T2, f13=(5%×1000×T3)/1000=5%×T3, and f14=(5%×100×T4)/1000=5%×T4. In this way, f11, f12, f13, and f14 can respectively reflect performance of the DRAM, the SCM, the SSD, and the HDD when the access proportions are 50%, 40%, 5%, and 5%. In this way, on a basis that the access proportions of the DRAM, the SCM, the SSD, and the HDD are 50%, 40%, 5%, and 5% respectively, performance F1 of the storage system may also be reflected by a sum of the average latencies of the various types of storage medium, that is, F1=f11+f12+f13+f14.

In this way, when access proportions of the various types of storage medium change, performance of the storage system under different access proportions of the various types of storage medium may be determined based on the foregoing manner of determining the average latency of accessing the storage medium, to determine a regular change of comprehensive system performance. The regular change of comprehensive system performance may be understood as a performance change curve corresponding to the storage system when an access proportion of data falling on storage medium of different types changes.

As shown in Table 1, the access proportions of accessing the DRAM, the SCM, the SSD, and the HDD respectively change from 50%, 40%, 5%, and 5% to 70%, 10%, 10%, and 10%. In this case, corresponding performance of the storage system is F2=f21+f22+f23+f24. Similarly, the access proportions of accessing the DRAM, the SCM, the SSD, and the HDD respectively change from 70%, 10%, 10%, and 10% to 60%, 20%, 15%, and 5%. In this case, corresponding performance of the storage system is F3=f31+f32+f33+f34. In this way, a hybrid storage system may determine the regular change of comprehensive system performance based on F1, F2, and F3.

In this way, after the regular change of the integrated system performance is determined, a maximum comprehensive performance value may be determined from the regular change of an integrated system performance by using an algorithm such as a preset gradient method. The maximum comprehensive performance value is used as the target comprehensive performance. For example, in the example shown in Table 1, if the target comprehensive performance determined from the regular change of comprehensive system performance is F1, the capacity proportion of the DRAM, the SCM, the SSD, and the HDD corresponding to Ft may be used as a target proportion capacity of the various types of storage medium, to determine a required cache capacity and a required persistent storage capacity.

It should be noted that Table 1 uses only one or more storage medium included in the first storage medium set and one or more storage medium included in the second storage medium set as an example for description.

In an actual application, in the second case mentioned above, for storage medium of a same type, reference may also be made to the foregoing determining the capacity of the cache and the capacity of the persistent storage based on comprehensive system performance for understanding, to determine a performance change of the storage system when different access proportions of the storage medium of the same type change, and further determine an optimal proportion between a capacity that can be used as the cache and a capacity that can be used as the persistent storage of the storage medium of the same type. Details are not described herein.

In addition, in actual application, the performance change of the storage system may be determined only from a perspective of different access proportions of each storage medium in the first storage medium set, or the performance change of the storage system may be determined only from a perspective of different access proportions of each storage medium in the second storage medium set. This is not specifically limited herein.

403: Adjust, based on the capacity of the cache and the capacity of the persistent storage, a purpose of a storage medium included in the storage system.

In this embodiment, after the capacity of the cache and the capacity of the persistent storage are obtained, the purpose of the storage medium included in the storage system may be adjusted, that is, a capacity proportion between a capacity that can be used as the cache and a capacity that can be used as the persistent storage in each storage medium is adjusted, to properly use the capacity of each storage medium to store the read hot data and the write hot data in the hot data. This provides a better access basis for adapting to requirements of different service scenarios. Specifically, step 403 may be performed by any storage node in the storage system shown in FIG. 1 or FIG. 2, or the controller in the storage system shown in FIG. 3. For example, for the distributed storage system shown in FIG. 1 or FIG. 2, the storage node 20a may adjust, based on the capacity of the cache and the capacity of the persistent storage, the purpose of a storage medium included in the distributed storage system. For the centralized storage system shown in FIG. 3, the controller 11 may adjust, based on the capacity of the cache and the capacity of the persistent storage, the purpose of the storage medium included in the distributed storage system.

Figure 5:
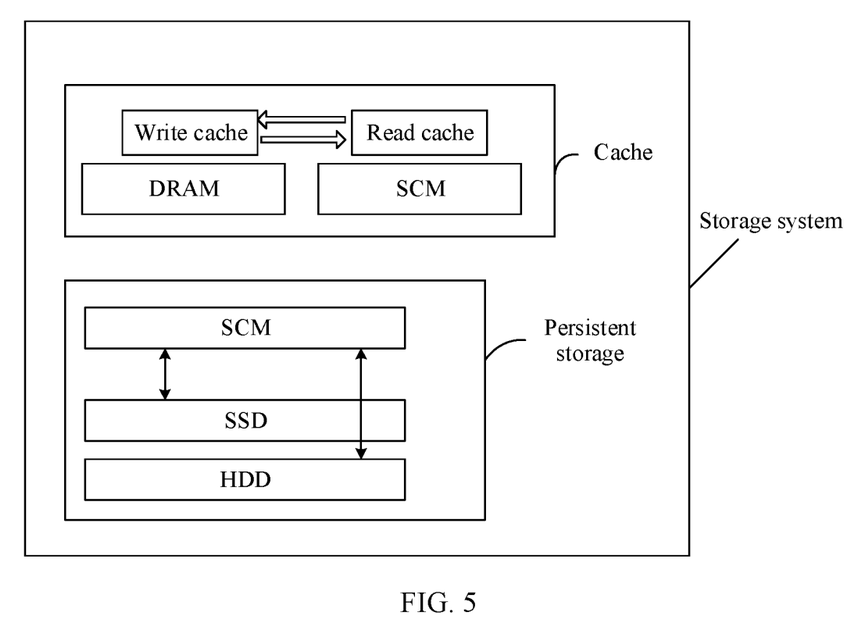
FIG. 5 is a schematic diagram of an application scenario according to an embodiment of this application.

For example, FIG. 5 is an example diagram of an application scenario according to an embodiment of this application. It can be learned from FIG. 5 that a storage system includes two SCMs. Storage medium used as caches include a DRAM and an SCM. Storage medium used as persistent storages include an SCM, an SSD, and an HDD. If the capacity of the cache and the capacity of the persistent storage are obtained based on the foregoing steps 401 to 403, a capacity that can be used as a cache in the entire DRAM and a capacity that can be used as a cache in the entire SCM may be separately adjusted based on the capacity of the cache. For example, in the foregoing step 402, 50% of the capacity may be configured from the DRAM as the capacity of the cache, and 40% of the capacity may be configured from the SCM as the capacity of the cache. Similarly, based on the capacity of the persistent storage, a capacity that can be used as a persistent storage in the entire SSD and a capacity that can be used as a persistent storage in the entire HDD may be respectively adjusted. For example, in step 402, 5% of the capacity may be configured from the SSD as the capacity of the persistent storage, and 5% of the capacity may be configured from the HDD as the capacity of the persistent storage. This is not specifically limited herein.

In this embodiment of this application, because the storage system includes one or more types of different storage medium, after the amount of hot data and the amount of cold data in the data are obtained by analyzing the cold and hot attributes of the data stored in the storage system, the capacity of the cache required by the storage system and the capacity of the persistent storage required by the storage system are determined, and the purpose of the storage medium included in the storage system is adjusted based on the capacity of the cache and the capacity of the persistent storage. That is, each type of storage medium used as the capacity of the cache and the capacity of the persistent storage is determined. In other words, by analyzing the cold and hot attributes of the data, a plurality of types of storage medium included in the storage system can be properly considered for flushing the data into the storage system, and purposes of the various types of storage medium can be properly adjusted based on the capacity of the cache required by the storage system and the capacity of the persistent storage required by the storage system, so that utilization of the various types of storage medium is maximized, thereby meeting storage capacity requirements of storage medium for different purposes in different services. In addition, corresponding data is stored by using storage capacities of the storage medium for different purposes, thereby greatly improving system performance and effectively reducing storage costs.

The foregoing mainly describes the solutions provided in embodiments of this application from the perspective of the methods. It may be understood that, to implement the foregoing functions, the foregoing capacity adjustment apparatus includes corresponding hardware structures and/or software modules for performing the functions. Persons skilled in the art should be easily aware that, in combination with the functions described in embodiments disclosed in this specification, this application can be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

From a perspective of functional units, in this application, the capacity adjustment apparatus may be divided into functional units based on the foregoing method embodiment. For example, each functional unit may be obtained through division based on a corresponding function, or two or more functions may be integrated into one functional unit. The integrated functional unit may be implemented in a form of hardware, or may be implemented in a form of a software functional unit.

Figure 6:
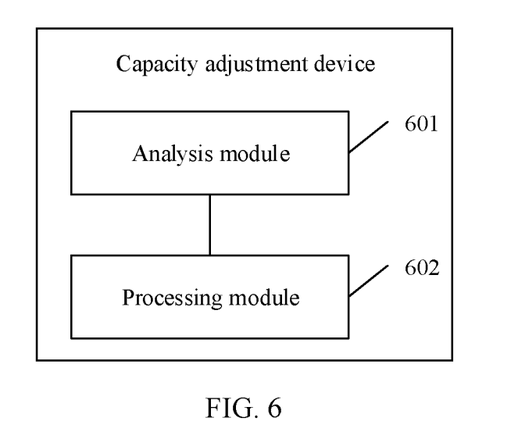
FIG. 6 is a schematic diagram of a structure of a capacity adjustment apparatus according to an embodiment of this application.

For example, when functional units are divided in an integrated manner, refer to FIG. 6. An embodiment of this application provides a capacity adjustment apparatus. The capacity adjustment apparatus is located in the storage systems shown in FIG. 1 to FIG. 3. Specifically, in the distributed storage system described in FIG. 1 or FIG. 2, the capacity adjustment apparatus may be any storage node in the plurality of storage nodes in the distributed storage system, for example, the storage node 20a, the storage node 20b, or the storage node 20c. In the centralized storage system described in FIG. 3, the capacity adjustment apparatus may also be a controller, a storage array, or the like in the centralized storage system. The foregoing storage system may include the first storage medium set and the second storage medium set. The first storage medium set includes one or more different storage medium, and the second storage medium set includes one or more different storage medium. The described capacity adjustment apparatus may include:

an analysis module 601, configured to analyze cold and hot attributes of data stored in the storage system, to obtain an amount of hot data and an amount of cold data in the data, where for details, refer to step 401 in the foregoing embodiment; and a processing module 602, configured to determine, based on the amount of hot data and the amount of cold data, a capacity of a cache required by the storage system and a capacity of a persistent storage required by the storage system, where the cache required by the storage system comes from the first storage medium set, and the persistent storage required by the storage system comes from the second storage medium set. For details, refer to step 402 in the foregoing embodiment. The analysis module 601 and the processing module 602 may be implemented by a processor in the storage device by running program instructions in the storage.

The processing module 602 is configured to adjust, based on the capacity of the cache and the capacity of the persistent storage, a purpose of a storage medium included in the storage system.

Optionally, in some examples, a type of a storage medium included in the first storage medium set includes a DRAM, an SSD, an SCM, or a ROM, and a type of a storage medium included in the second storage medium set includes an SCM, an SSD, or an HDD.

Optionally, in some examples, the type of the storage medium included in the first storage medium set is different from the type of the storage medium included in the second storage medium set.

Optionally, in some examples, the first storage medium set and the second storage medium set include storage medium of a same type.

Optionally, in some examples, the processing module 602 is configured to determine, based on the amount of hot data and the amount of cold data, and capacities of various types of storage medium included in the storage system, the capacity of the cache required by the storage system and the capacity of the persistent storage required by the storage system.

In this embodiment of this application, the analysis module 601 analyzes the cold and hot attributes of the data, so that a plurality of types of storage medium included in the storage system can be properly considered for flushing the data into the storage system, and purposes of the various types of storage medium can be properly adjusted by the processing module 602 based on the capacity of the cache required by the storage system and the capacity of the persistent storage required by the storage system, so that utilization of the various types of storage medium is maximized, thereby meeting storage capacity requirements of storage medium for different purposes in different services. In addition, corresponding data is stored by using storage capacities of storage medium for different purposes, thereby greatly improving system performance and effectively reducing storage costs.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When the software is used for implementation, all or some of embodiments may be implemented in a form of a computer program product.

The computer program product includes one or more computer instructions. When the computer-executable instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable medium. The usable medium may be a magnetic medium (for example, a floppy disk, a hard disk, or a magnetic tape), an optical medium (for example, a DVD), a semiconductor medium (for example, an SSD), or the like.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A capacity adjustment method, wherein the method is applied to a storage system, and the method comprises:
   analyzing cold and hot attributes of data stored in the storage system, to obtain an amount of hot data and an amount of cold data in the data;
   wherein the storage system comprises a first storage medium set comprising one or more different storage medium, and a second storage medium set comprising one or more different storage medium;
   determining, based on the amount of hot data and the amount of cold data, a capacity of a cache required by the storage system and a capacity of a persistent storage required by the storage system, wherein the cache required by the storage system comes from the first storage medium set, the persistent storage required by the storage system comes from the second storage medium set; and
   adjusting, based on the capacity of the cache and the capacity of the persistent storage, a purpose of a storage medium comprised in the storage system including adjusting a ratio of the capacity of the cache to the capacity of the persistent storage in the storage medium.

2. The method according to claim 1, wherein a type of a storage medium comprised in the first storage medium set comprises a dynamic random access memory (DRAM), a storage class memory (SCM), a solid-state drive (SSD), or a read-only memory (ROM), and a type of a storage medium comprised in the second storage medium set comprises an SCM, an SSD, or a hard disk drive (HDD).

3. The method according to claim 2, wherein the type of the storage medium comprised in the first storage medium set is different from the type of the storage medium comprised in the second storage medium set.

4. The method according to claim 1, wherein the first storage medium set and the second storage medium set comprise storage medium of a same type.

5. The method according to claim 1, wherein the determining the capacity of the cache required by the storage system and the capacity of the persistent storage required by the storage system comprises:
   determining, based on the amount of hot data and the amount of cold data, and capacities of various types of storage medium comprised in the storage system, the capacity of the cache required by the storage system and the capacity of the persistent storage required by the storage system.

6. A capacity adjustment apparatus, wherein the capacity adjustment apparatus is located in a storage system, the storage system comprises a first storage medium set and a second storage medium set, and the capacity adjustment apparatus comprises:
   at least one processor; and
   one or more memories coupled to the at least one processor and storing programming instructions for execution by the at least one processor to perform operations comprising:
   analyzing cold and hot attributes of data stored in the storage system, to obtain an amount of hot data and an amount of cold data in the data;
       wherein the storage system comprises a first storage medium set comprising one or more different storage medium, and a second storage medium set comprising one or more different storage medium;
   determining, based on the amount of hot data and the amount of cold data, a capacity of a cache required by the storage system and a capacity of a persistent storage required by the storage system, wherein the cache required by the storage system comes from the first storage medium set, the persistent storage required by the storage system comes from the second storage medium set; and
   adjusting, based on the capacity of the cache and the capacity of the persistent storage, a purpose of a storage medium comprised in the storage system including adjusting a ratio of the capacity of the cache to the capacity of the persistent storage in the storage medium.

7. The capacity adjustment apparatus according to claim 6, wherein a type of a storage medium comprised in the first storage medium set comprises a dynamic random access memory (DRAM), a storage class memory (SCM), a solid-state drive (SSD), or a read-only memory (ROM), and a type of a storage medium comprised in the second storage medium set comprises an SCM, an SSD, or a hard disk drive (HDD).

8. The capacity adjustment apparatus according to claim 7, wherein the type of the storage medium comprised in the first storage medium set is different from the type of the storage medium comprised in the second storage medium set.

9. The capacity adjustment apparatus according to claim 6, wherein the first storage medium set and the second storage medium set comprise storage medium of a same type.

10. The capacity adjustment apparatus according to claim 6, wherein the determining, based on the amount of hot data and the amount of cold data, a capacity of a cache required by the storage system and a capacity of a persistent storage required by the storage system comprises:
determining, based on the amount of hot data and the amount of cold data, and capacities of various types of storage medium comprised in the storage system, the capacity of the cache required by the storage system and the capacity of the persistent storage required by the storage system.

11. A storage system, comprising:
a first storage medium set and a second storage medium set;
at least one processor; and
one or more memories coupled to the at least one processor and storing programming instructions for execution by the at least one processor to perform operations comprising:
analyzing cold and hot attributes of data stored in the storage system, to obtain an amount of hot data and an amount of cold data in the data;
wherein the storage system comprises a first storage medium set comprising one or more different storage medium, and a second storage medium set comprising one or more different storage medium;
determining, based on the amount of hot data and the amount of cold data, a capacity of a cache required by the storage system and a capacity of a persistent storage required by the storage system, wherein the cache required by the storage system comes from the first storage medium set, the persistent storage required by the storage system comes from the second storage medium set; and
adjusting, based on the capacity of the cache and the capacity of the persistent storage, a purpose of a storage medium comprised in the storage system including adjusting a ratio of the capacity of the cache to the capacity of the persistent storage in the storage medium.

12. The storage device according to claim 11, wherein a type of a storage medium comprised in the first storage medium set comprises a dynamic random access memory (DRAM), a storage class memory (SCM), a solid-state drive (SSD), or a read-only memory (ROM), and a type of a storage medium comprised in the second storage medium set comprises an SCM, an SSD, or a hard disk drive (HDD).

13. The storage device according to claim 12, wherein the type of the storage medium comprised in the first storage medium set is different from the type of the storage medium comprised in the second storage medium set.

14. The storage device according to claim 11, wherein the first storage medium set and the second storage medium set comprise storage medium of a same type.

15. The storage device according to claim 11, wherein the determining the capacity of the cache required by the storage system and the capacity of the persistent storage required by the storage system comprises:
determining, based on the amount of hot data and the amount of cold data, and capacities of various types of storage medium comprised in the storage system, the capacity of the cache required by the storage system and the capacity of the persistent storage required by the storage system.

16. A non-transitory computer-readable storage medium, wherein the computer-readable storage medium stores a computer program; and upon the computer program being executed on a computer, the computer is enabled to perform operations including:
analyzing cold and hot attributes of data stored in a storage system, to obtain an amount of hot data and an amount of cold data in the data;
wherein the storage system comprises a first storage medium set comprising one or more different storage medium, and a second storage medium set comprising one or more different storage medium;
determining, based on the amount of hot data and the amount of cold data, a capacity of a cache required by the storage system and a capacity of a persistent storage required by the storage system, wherein the cache required by the storage system comes from the first storage medium set, the persistent storage required by the storage system comes from the second storage medium set; and
adjusting, based on the capacity of the cache and the capacity of the persistent storage, a purpose of a storage medium comprised in the storage system including adjusting a ratio of the capacity of the cache to the capacity of the persistent storage in the storage medium.

17. The non-transitory computer-readable storage medium according to claim 16, wherein a type of a storage medium comprised in the first storage medium set comprises a dynamic random access memory (DRAM), a storage class memory (SCM), a solid-state drive (SSD), or a read-only memory (ROM), and a type of a storage medium comprised in the second storage medium set comprises an SCM, an SSD, or a hard disk drive (HDD).

18. The non-transitory computer-readable storage medium according to claim 16, wherein the type of the storage medium comprised in the first storage medium set is different from the type of the storage medium comprised in the second storage medium set.

19. The non-transitory computer-readable storage medium according to claim 16, wherein the first storage medium set and the second storage medium set comprise storage medium of a same type.

20. The non-transitory computer-readable storage medium according to claim 16, wherein the determining the capacity of the cache required by the storage system and the capacity of the persistent storage required by the storage system comprises:
determining, based on the amount of hot data and the amount of cold data, and capacities of various types of storage medium comprised in the storage system, the capacity of the cache required by the storage system and the capacity of the persistent storage required by the storage system.

* * * * *

UNITED STATES PATENT AND TRADEMARK OFFICE
CERTIFICATE OF CORRECTION

| | | |
|---|---|---|
| PATENT NO. | : 12,271,609 B2 | Page 1 of 1 |
| APPLICATION NO. | : 18/355233 | |
| DATED | : April 8, 2025 | |
| INVENTOR(S) | : Huang et al. | |

It is certified that error appears in the above-identified patent and that said Letters Patent is hereby corrected as shown below:

In the Claims

Claim 1: Column 20, Line 11: "medium comprised in the storage system including" should read as -- medium comprised in the storage system, including --.

Signed and Sealed this
Thirtieth Day of September, 2025

John A. Squires
*Director of the United States Patent and Trademark Office*